US009542766B1

(12) United States Patent
Baumgartner et al.

(10) Patent No.: US 9,542,766 B1
(45) Date of Patent: Jan. 10, 2017

(54) INTELLIGENT CONFIGURATION OF DATA VISUALIZATIONS

(71) Applicant: Microsoft Technology Licensing, LLC, Redmond, WA (US)

(72) Inventors: Patrick J Baumgartner, Kirkland, WA (US); Pedram Faghihi Rezaei, Seattle, WA (US); Matthew J. Longley, Enumclaw, WA (US); Sachin Patney, Mountlake Terrace, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/752,722

(22) Filed: Jun. 26, 2015

(51) Int. Cl.
*G06K 9/00* (2006.01)
*G06T 11/60* (2006.01)
*G06T 1/00* (2006.01)
*G06T 7/00* (2006.01)
*G06T 7/40* (2006.01)
*G06F 17/30* (2006.01)

(52) U.S. Cl.
CPC ........... *G06T 11/60* (2013.01); *G06F 17/3025* (2013.01); *G06F 17/30253* (2013.01); *G06T 1/0007* (2013.01); *G06T 7/0022* (2013.01); *G06T 7/408* (2013.01); *G06T 2207/10024* (2013.01)

(58) Field of Classification Search
USPC 382/181, 165, 115, 118, 128, 162; 345/589; 348/222.1; 358/448; 600/300, 600/301; 703/11; 707/705, 758
See application file for complete search history.

(56) References Cited

U.S. PATENT DOCUMENTS

| 6,842,176 | B2 | 1/2005 | Sang'udi et al. |
| 7,245,762 | B2 | 7/2007 | Shin et al. |
| 7,809,185 | B2 | 10/2010 | Li et al. |
| 8,038,614 | B2* | 10/2011 | Gobeyn ................ A61B 5/103 382/128 |
| 8,038,615 | B2* | 10/2011 | Gobeyn ............... A61B 5/0059 382/128 |

(Continued)

OTHER PUBLICATIONS

Ciavolino, et al, "Generalized Automatic Color Selection for Visualization," Published on: Oct. 23, 2011, Available at: http://amyciavolino.com/assets/color.pdf 7 pages.

(Continued)

*Primary Examiner* — Anh Do
(74) *Attorney, Agent, or Firm* — Kate Drakos; Micky Minhas; Lee & Hayes PLLC

(57) ABSTRACT

The techniques described herein determine configurations for data visualizations based on characteristics interpreted from input data. Input data including a plurality of images may be obtained. For instance, the input data may include one or more files containing images associated with an entity. The techniques disclosed herein may determine a characteristic, such as a primary color, based on the input data. The techniques disclosed herein may determine an individual entity or subject to be associated with the characteristic. Techniques disclosed herein also involve the generation of output data defining a visualization based on the characteristic. A rendering of the output data provides an indication of the individual entity or subject. In some configurations, a rendering of the output data provides a graphical association between data in a dataset and the individual entity or subject.

20 Claims, 8 Drawing Sheets

(56) References Cited

U.S. PATENT DOCUMENTS

| | | | |
|---|---|---|---|
| 8,062,220 B2 * | 11/2011 | Kurtz | A61B 5/0059 348/222.1 |
| 8,756,521 B1 | 6/2014 | Farchmin et al. | |
| 2007/0147685 A1 | 6/2007 | Ericson | |
| 2009/0327883 A1 | 12/2009 | Robertson et al. | |
| 2011/0055722 A1 | 3/2011 | Ludwig | |
| 2012/0179692 A1 | 7/2012 | Hsiao et al. | |
| 2013/0083999 A1 | 4/2013 | Bhardwaj et al. | |
| 2013/0097544 A1 | 4/2013 | Parker et al. | |
| 2013/0183649 A1 | 7/2013 | Monroe et al. | |
| 2014/0331179 A1 | 11/2014 | Tullis et al. | |
| 2015/0112980 A1 | 4/2015 | Sanio et al. | |

OTHER PUBLICATIONS

Eisemann, et al., "Data Drive Color Mapping," In Proceedings of International Workshop on Visual Analytics, May 2011, 2 pages.

Healey, "Choosing Effective Colours for data Visualization," In Proceedings of Workshop Vision, Modeling, and Visualization, Nov. 2000, 9 pages.

Huh, "eDAVIS: An Enhanced Data VIsualization System," eDAVIS: An Enhanced Data Visualization. Retrieved on Apr. 7, 2015, available at: http://stat.skku.ac.kr/myhuh/DAVIS/sub/eDAVIS.pdf, 14 pages.

Lin, et al., "Selecting Semantically-Resonant Colors for Data Visualization," In Proceedings of the 15th Eurographics Conference on Visualization, vol. 32, Issue 3, Jun. 17, 2013, 10 pages.

Rezk-Salama, et al., "Automatic Adjustment of Transfer Functions for 3D Volume Visualization," In Proceedings of Workshop Vision, Moedling, and Visualization, Nov. 2000, 8 pages.

"SAP Business Objects Business Intelligence Suite", Published on: Jan. 9, 2015 Available at: http://help.sap.com/businessobject/product_guides/ sbo41/en/sbo41_whats_new_en.pdf, 52 pages.

The PCT Search Report and Written Opinion mailed Aug. 16, 2016 for PCT application No. PCT/US2016/039139, 13 pages.

* cited by examiner

| COUNTRY | GDP (T $) | EXPORT |
|---|---|---|
| China | 9.24 | 26.4 |
| Brazil | 2.25 | 12.6 |
| USA | 16.8 | 13.5 |
| India | 1.88 | 25.2 |
| Japan | 4.9 | 16.2 |

FIG. 3A

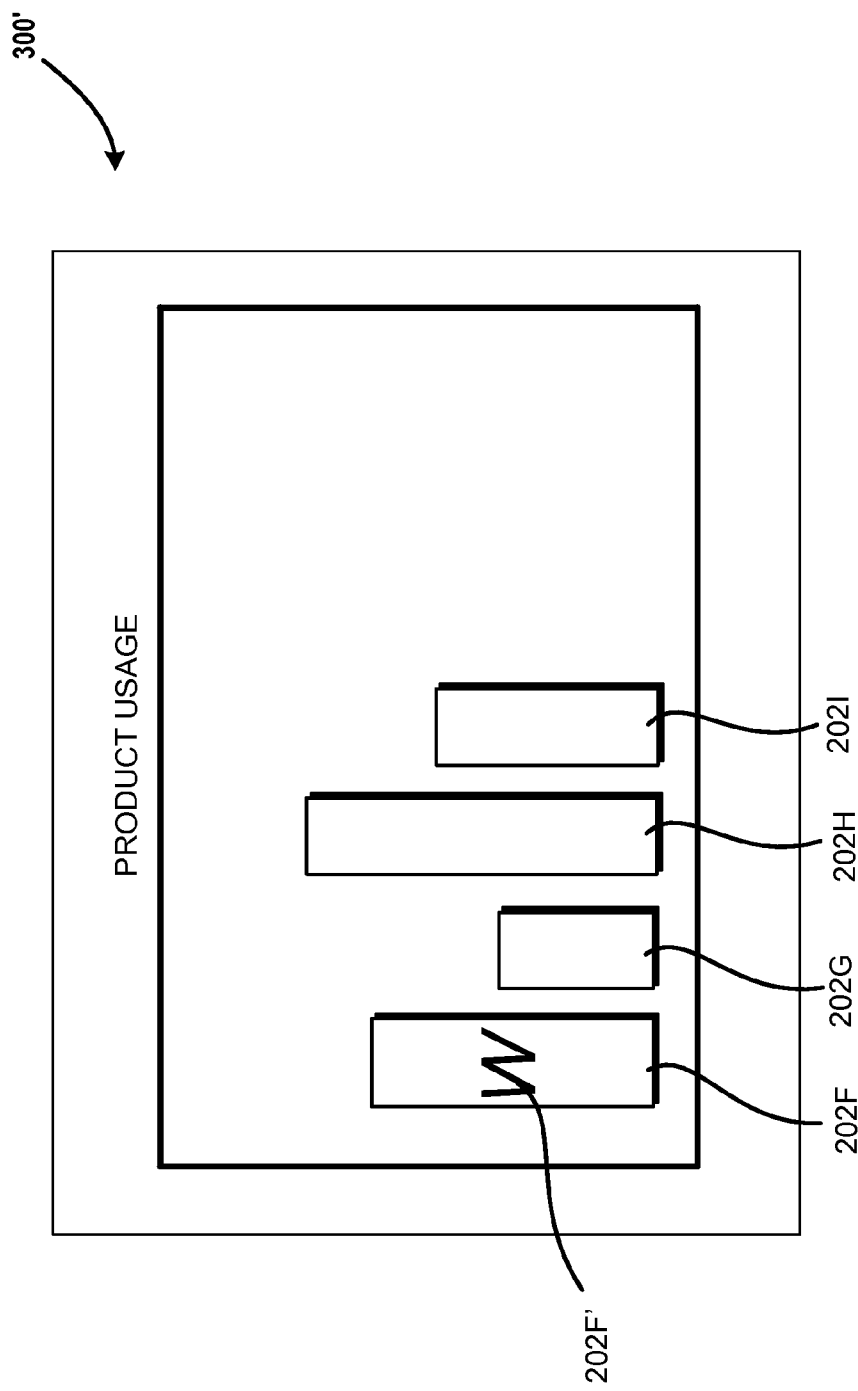

INTELLIGENT CONFIGURATION OF DATA VISUALIZATIONS

BACKGROUND

Most programs used for processing large datasets utilize pre-determined layouts to assist users in formatting and interpreting displayed data. For instance, a customer relationship management ("CRM") program may use a predetermined layout to display performance data of several companies. In some scenarios, a dataset may be large, having hundreds or thousands of company names that may be immersed in different types of displayed data.

Although some existing systems provide various formats and other techniques for displaying large amounts of data, some current techniques may not be effective in allowing users to readily interpret associations between different types of data. For instance, in some layouts it may be difficult for users to readily associate a particular entity, e.g., a company, with related data. Accurate and efficient user interpretation of displayed data becomes an even bigger challenge when a preset data layout includes a large amount of data and a large number of entities.

It is with respect to these and other considerations that the disclosure made herein is presented.

SUMMARY

Technologies are described herein for providing intelligent configuration of data visualizations. In some configurations, the techniques described herein determine formatting elements for data visualizations to help users interpret displayed data and associations between different types of data. In some configurations, the techniques disclosed herein may determine a characteristic based, at least in part, on the input data. For example, a system implementing techniques disclosed herein can obtain input data including a number of images associated with one or more entities. When the input data includes an image, such as an image of a flag, techniques described herein analyze the input data to determine a characteristic, such as a primary color of the flag. The techniques disclosed herein may select a subject to be associated with the determined characteristic. For instance, in the present example, if the flag is associated with a subject, such as a country, the primary color is associated with the subject.

The techniques disclosed herein also involve the generation of a visualization based on the determined characteristic. For example, if the determined characteristic includes a primary color, the visualization may include a graphical element or object including the primary color. As will be described in more detail below, the visualization may include any layout, graphical element, arrangement of elements, or set of display properties. The techniques disclosed herein also include the generation of output data that is configured to provide a graphical association between the visualization and the selected subject.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to systems, methods, computer-readable instructions, modules, algorithms, hardware logic and/or operations as permitted by the context described above and throughout the document. Items or conditions that Furthermore, the claimed subject matter is not limited to implementations that solve any or all disadvantages noted in any part of this disclosure.

BRIEF DESCRIPTION OF THE DRAWINGS

FIG. 3A is a screen diagram showing an illustrative graphical user interface that is configured to display visualizations and associated data.

FIG. 3B is a screen diagram showing an illustrative graphical user interface that is configured to display visualizations configured to represent associated data.

DETAILED DESCRIPTION

Figure 1:
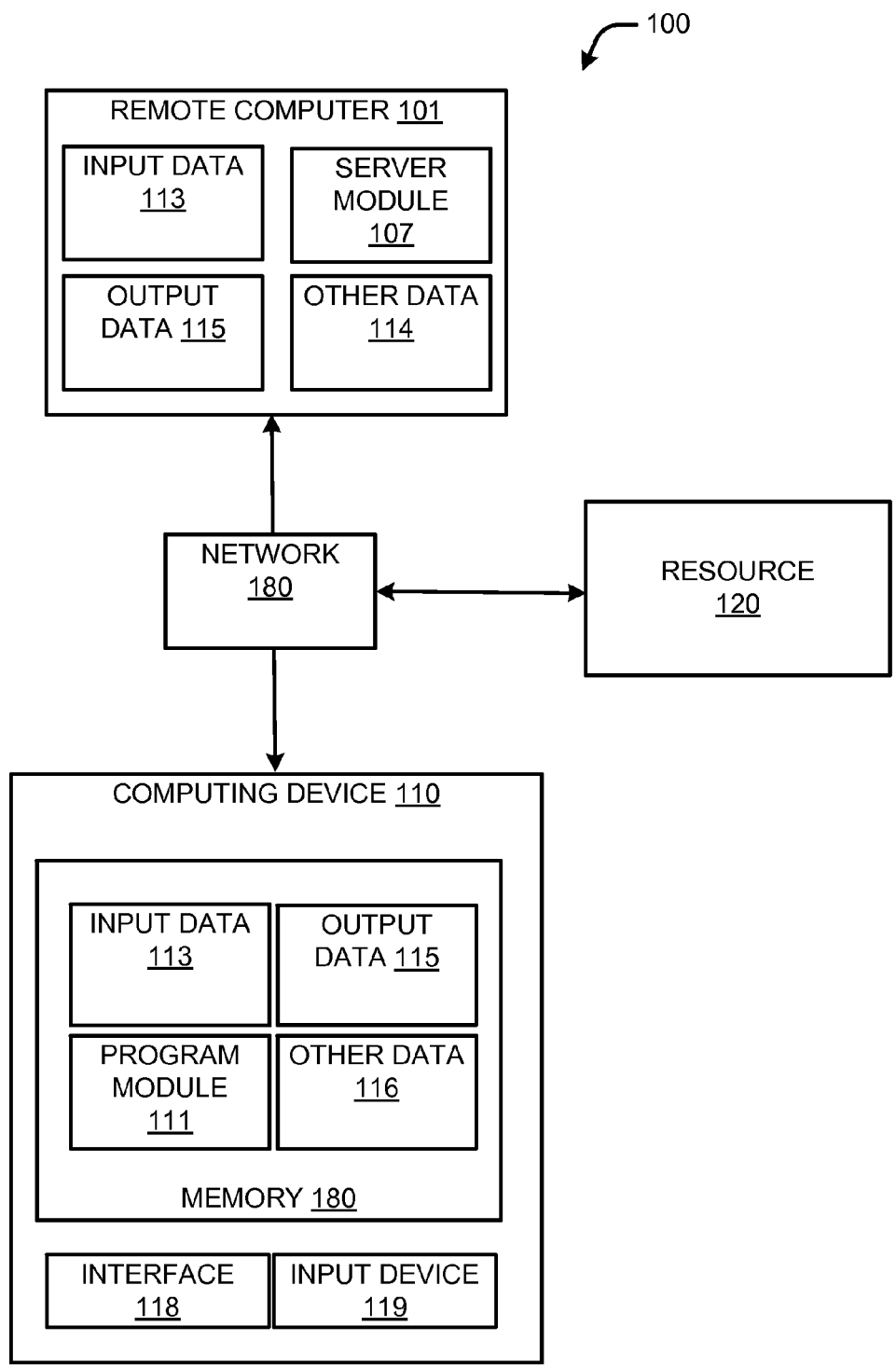
FIG. 1 is a computer system architecture diagram showing several example components of a system for providing intelligent configuration of data visualizations.

Technologies are described herein for providing intelligent configuration of data visualizations. In some configurations, the techniques described herein determine formatting elements for data visualizations to help users interpret displayed data and associations between different types of data. In some configurations, the techniques disclosed herein may determine a characteristic based, at least in part, on the input data. For example, a system implementing techniques disclosed herein can obtain input data including a number of images associated with one or more entities. When the input data includes an image, such as an image of a flag, techniques described herein analyze the input data to determine a characteristic, such as a primary color of the flag. The techniques disclosed herein may select a subject to be associated with the determined characteristic. For instance, in the present example, if the flag is associated with a subject, e.g., a country, the primary color is associated with the subject.

Techniques disclosed herein also involve the generation of a visualization based on the characteristic. For example, if the determined characteristic includes a primary color, a generated visualization may include a graphical element or object including the primary color. A visualization based on a characteristic, such as a color or graphical element that may have been customarily associated with a subject, helps users readily identify the subject.

For illustrative purposes, a subject may include an individual or an entity, such as a country, company, sports teams, or an affiliation with an organization. A subject may also include a topic or an object. In one illustrative example, if the input data includes images that include a flag of a particular country, characteristics, such as colors or other aspects, that are customarily associated with the flag can be used in a visualization to provide an indication of the particular country. The techniques disclosed herein also include the generation of output data that is configured to provide a graphical association between the subject and data related to the subject. For example, statistical data associated with the country may be arranged in proximity to a generated visualization to provide a graphical association between the statistical data and the country.

The techniques disclosed herein can configure the visualization in a number of ways. For example, techniques disclosed may derive a contextually-relevant set of display properties, such as brightness, hue, and contrast to provide an indication of a subject or a graphical association between a subject and related data. In addition, as will be described in more detail below, the visualization may include any layout, graphical element, arrangement of elements, or set of display properties. For example, a generated visualization may include display properties, such as a font or font size, to provide an indication of a subject. These examples are provided for illustrative purposes and are not to be construed as limiting. The techniques disclosed herein may utilize, generate or display any theme, motif, or any other combination of graphical elements to represent or provide an indication of a subject.

In some configurations, the techniques disclosed herein determine a quantity value for individual characteristics defined in the input data. For instance, if portion of the input data includes an image of a flag, techniques disclosed herein may identify a ratio for quantifying individual colors of the flag. As will be described in more detail below, a characteristic, such as a primary color, may be selected based on one or more determined ratios and/or determined quantity values.

In some configurations, one or more factors can influence the selection of a characteristic, such as a primary color. For instance, if the input data contains images of two flags and the flags have similar colors, the techniques disclosed herein may utilize other contextual data, such as an entity name, to determine the characteristic. In such an example, as will be described in more detail below, the alphabetical order of subject names may be used to determine the characteristic.

In some configurations, techniques described herein optimize the distinctiveness of the selected characteristics and/or visualizations. For example, once a particular characteristic is associated with a subject, that particular characteristic may not be associated with another subject. As will be described in more detail below, an alternate characteristic, such as an alternate color, may be selected and associated with a subject.

In some configurations, the techniques herein may also obtain data from one or more resources to determine one or more characteristics. For instance, a computing device may obtain input data containing text describing a subject. The computing device may then analyze the input data to determine a context related to the subject. Any known technology for determining a context, e.g., generating contextual data, by analyzing text data or any other information may be used by the techniques disclosed herein. In one example, the input data may include a descriptive sentence about a consumer product. One or more algorithms for analyzing such data may generate contextual data related to the product. In one specific example, the contextual data can include a company name and/or a product name based on the descriptive sentence. The contextual data can include a string such as the company name or the product name.

The contextual data may be sent to one or more resources, such as a search engine, social network and/or another service. The one or more resources can return supplemental input data, such as an image or other data. Then, based on the supplemental input data, one or more characteristics, such as a primary color, may be determined. As described in the examples provided below, the one or more characteristics may be used to generate a visualization to be associated with the subject.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a device may be improved as the use of the techniques herein enable efficient interpretation of data. Improved human interaction with the device by the use of one or more visualizations may mitigate issues related to inadvertent inputs and other errors. In addition, improved human interaction improves other computing resources such as processor and network resources.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing intelligent configuration of data visualizations. As will be described in more detail below with respect to FIGS. 5-7, there are a number of applications and services that can embody the functionality and techniques described herein.

FIG. 1 is a system diagram showing aspects of one illustrative mechanism disclosed herein for providing intelligent configuration of data visualizations. As shown in FIG. 1, a system 100 may include a remote computer 101 and a computing device 110. In some configurations, the remote computer 101 and a computing device 110 may utilize a resource 120, such as a search engine or any other service illustrated in FIG. 6. The computing device 110 may operate as a stand-alone device, or the computing device 110 may operate in conjunction with another computer, such as the remote computer 101. As can be appreciated, the remote computer 101 and the computing device 110 are interconnected through one or more local and/or wide area networks 180. It should be appreciated that this example is provided for illustrative purposes only and is not to be construed as limiting. The techniques described herein may utilize more or fewer computers than those shown in FIG. 1.

The computing device 110 may be in the form of a personal computer, a wearable computer, a mobile phone, or any other device having components for processing and communicating data. For example, the computing device 110 may be a tablet having an interface 118 and at least one input device 119. Data displayed on the interface 118, such as a monitor, projection surface, touch screen, or any other device, allows a user to interact with the computing device 110. In addition, by the use of at least one input device 119, such as a camera, microphone, keyboard or any other device, a user may provide input data 113. For illustrative purposes, the input data 113 may include one or more images.

The computing device 110 may include a local memory 180 that is capable of storing, communicating, and processing input data 113, output data 115, and other data 114. The local memory 180 may also include a program module 111 configured to manage techniques described herein and interactions between a user and the computing device 110. The program module 111 may be a game application, a virtual reality application, a productivity application, an operating system component or any other application configured to process data.

The remote computer 101 may be in the form of a personal computer, server computer or a number of server computers configured to store and process data. As can be appreciated, the remote computer 101 may be configured to communicate, process, and store the input data 113, output data 115, and other data 114. The remote computer 101 may also include components such as the server module 107, for executing one or more techniques described herein. As will be described in more detail herein, the server module 107 may operate in conjunction with, or independent of, other modules, such as the program module 111, to implement aspects of the techniques disclosed herein.

In one illustrative example, during operation, the computing device 110 may obtain input data 113. The input data 113 may be from any resource, such as another computer or a user input. In addition, the input data 113 may be in any format. In some configurations, the input data 113 may include characteristics that may be identified by the system 100. For instance, if the input data 113 includes one or more images, techniques disclosed herein may identify a primary color. In other examples, the input data 113 may include formatting characteristics or other display characteristics that may be identified by the system 100. These examples are provided for illustrative purposes only and are not to be construed as limiting.

The techniques disclosed herein may determine a characteristic based, at least in part, on a portion of the input data 113. For example, if a portion of the input data 113 includes an image of a flag, techniques described herein analyze the input data 113 to determine a primary color of the flag. If the flag has multiple colors, the system 100 determines a value associated with each color and selects a primary color based, at least in part, on the values associated with individual colors. As will be described in more detail below, a number of known techniques may be used to determine a primary color or other characteristics based on the input data 113.

The techniques disclosed herein may also determine an individual subject to be associated with a determined characteristic. The input data 113 or other data 116 may be analyzed to determine the individual subject to be associated with the determined characteristic. For instance, the input data 113 may include an image of a flag and data indicating an associated entity, such as a country. Such data may be used to determine an individual subject to be associated with a determined characteristic.

As summarized above, techniques disclosed herein may generate a visualization based on the characteristic. For example, if the determined characteristic includes a primary color, a generated visualization may include a graphical element or object including the primary color. The visualization may include any layout, graphical element, arrangement of elements, or set of display properties. The techniques disclosed herein also include the generation of output data that is configured to provide a graphical association between the visualization and the selected subject. Examples of several visualizations are described in more detail below and shown in FIG. 3A and FIG. 3B.

As summarized above, the techniques herein may also obtain data from one or more resources to determine one or more characteristics. For instance, a computing device 110 may obtain input data 113 containing text or other information. The computing device 110 may then analyze the input data 113 to determine a context related to a subject. Any known technology for determining a context and generating contextual data by analyzing text data or any other information may be used by the techniques disclosed herein. In one example, the input data 113 may include a descriptive sentence about a consumer product. One or more algorithms for analyzing such data may generate contextual data related to the product. In one specific example, the contextual data can include a company name and/or a product name based on the descriptive sentence. The contextual data may be in the form of a string including information such as a company name or a product name.

The contextual data may be sent to one or more resources 120, such as a search engine, social network platform and/or another service. The one or more resources 120 can return supplemental input data 113, such as an image or other data. Then, based on the supplemental input data 113, one or more characteristics, such as a primary color, may be determined. As described above, the one or more characteristics may be used to generate a visualization to be associated with the subject.

Figure 2:
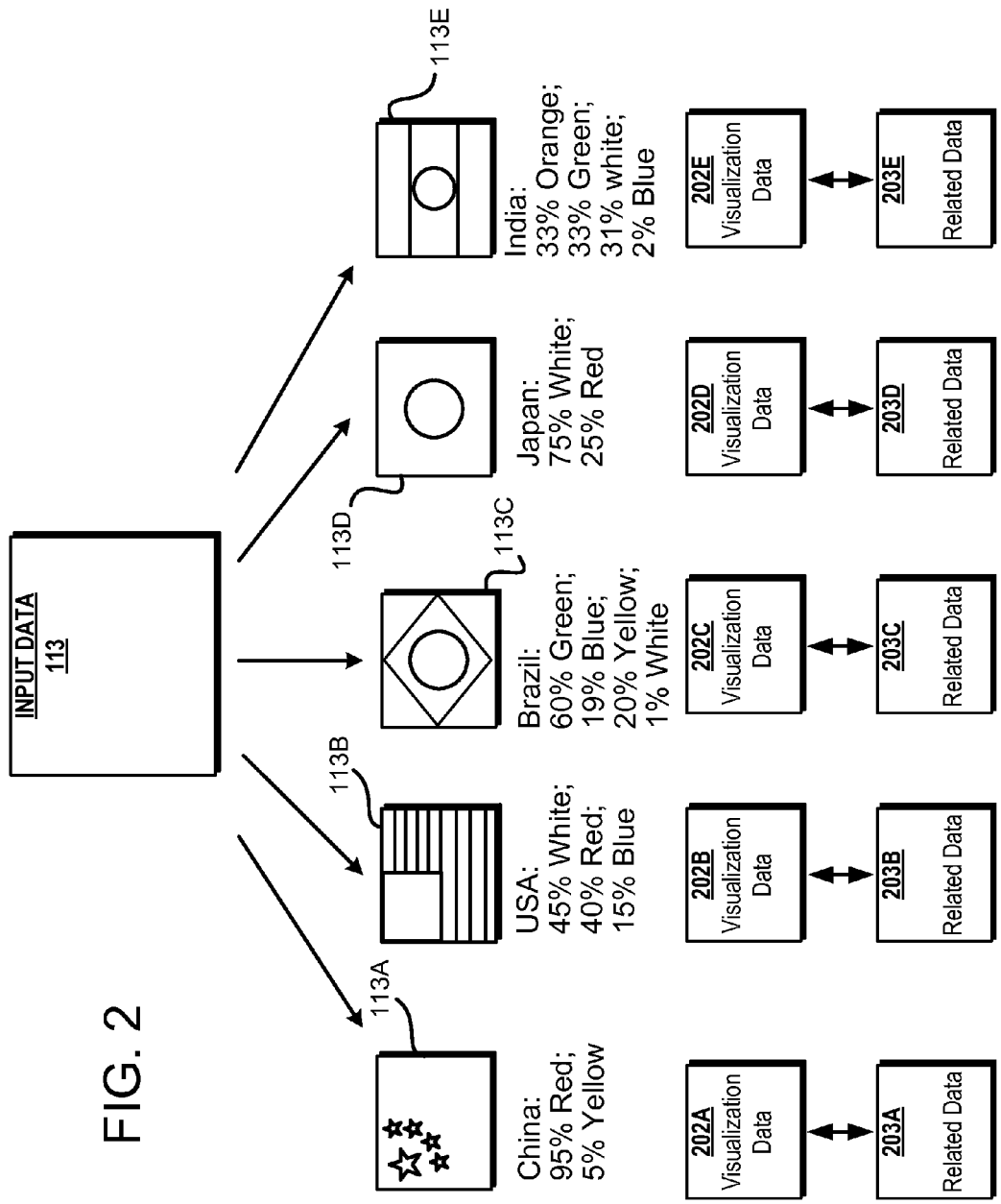
FIG. 2 illustrates an example showing images and associations between visualizations and related data.

Referring now to FIG. 2, FIG. 3A, and FIG. 3B details regarding example input data 113 and an example visualization are provided. As will be shown in the following examples, the visualizations are configured to provide an indication of a subject and/or assist users interpret and associate displayed data with the subject. For illustrative purposes, consider the following scenario. Suppose the system 100 is being used to create one or more data visualizations for the gross domestic product (GDP) of China, Brazil, India, Japan, and the United States by year.

Also in the present example, as shown in FIG. 2, the input data 113 includes images (113A-113E) of flags. In addition, the input data 113 includes data associating each flag with individual countries: China, Brazil, India, Japan, and the United States. Further suppose, in this example, that the input data 113 contains entity data, such as GDP data related to the above-listed countries. For illustrative purposes, an individual image, such as the first image 113A and the second image 113B, may be generically referenced as an "image 113." It can also be appreciated that other data 116 (shown in FIG. 1) may be obtained from one or more resources, and other data 116 may also provide entity data, image data, and other related information.

By the use of one or more known techniques for analyzing image data, one or more characteristics, such as a primary color, may be determined. In one illustrative example, a quantity value, such as a ratio associated with individual colors, may be determined for individual images. The quantity values for each color may identify a dominate color in an individual image. In some configurations, the determined characteristic may be based, at least in part, on the detection of a dominate color. The techniques disclosed herein may utilize any suitable technology for identifying colors or other characteristics of an image.

In the present example, the input data 113 is processed to determine a primary color for the individual flags. Specifically, in this example, the system 100 generates a quantity value for the individual colors of each flag. An example dataset having respective quantity values for several characteristics is shown in TABLE 1.

China: 95% Red; 5% Yellow
Brazil: 60% Green; 19% Blue; 20% Yellow; 1% White
USA: 45% White; 40% Red; 15% Blue
India: 33% Orange; 33% Green; 31% white; 2% Blue
Japan: 75% White; 25% Red
Table 1

The determined characteristic, such as a primary color, can be selected using a number of existing technologies. For example, a dominant color within an image may be selected as the primary color. In the present example, the system 100 is configured to select a dominant color. Also, in this example, the system 100 is configured to ignore white colors. As will also be described below, the system 100 can also be configured to select alternate colors instead of duplicating the use of some colors.

In applying the techniques disclosed herein to the data of TABLE 1, one or more primary colors can be selected. For example, since the first image 113A is 95% red, the system 100 may determine that the first primary color is red. In repeating the techniques disclosed herein, since the second image 113B contains blue, and since (in this example) whites are ignored, and red is already assigned, the system 100 may determine that the second primary color is blue. Since the third image 113C is 60% green, the system 100 may determine that the third primary color is green.

Further, since whites are ignored and red is already assigned, the fourth primary color is determined to be purple. Such a color may be selected in such scenarios since purple is not assigned to another entity and because purple is not associated with other entities or utilized in the input data 113. Some configurations avoid the use of colors or other characteristics of the input data 113 to reduce the use of colors that may be associated with other entities or subjects. In addition, since the fifth image 113E is 33% orange, the system 100 may determine that the fifth primary color is orange. Such examples are provided for illustrative purposes and are not to be construed as limiting.

Also shown in FIG. 2, visualization data (202A-202E) may be generated from the determined characteristics, e.g., the above-described primary colors. As summarized above, one or more visualizations may be generated, which may include a graphical element or object based on the determined characteristic. In addition, data (203A-203E) (also referred to herein as "related data 203") of one or more subjects may be associated with the visualization data (202A-202E). In this example, an individual visualization 202A, which may include the first primary color, may be associated with a first section of related data 203A. As will be described below, the other visualizations (202B-202E) and the other sections of related data (203B-203E) are processed and configured in a similar fashion.

For illustrative purposes, the related data (203A-203E) may include any data associated with one or more subjects. Examples of related data (203A-203E) can include an entity name and other relevant data such as performance data. The system 100 may then generate output data 115 defining the visualizations configured to show associations between different sets of data. In the present example, the visualizations and related data can be generated, utilized, and/or displayed. For illustrative purposes, the association between the related data (203A-203E) and the visualization data (202A-202E) is represented by the bidirectional arrows shown in FIG. 2.

As summarized above, techniques disclosed herein may provide intelligent configuration of data visualizations. In some configurations, the output data 115 defining one or more visualizations may be displayed showing associations between entities and related data. For illustrative purposes, a visualization may include an arrangement of graphical elements, such as lines, boxes, and/or any other graphical elements having one or more display properties, such as a primary color. Such examples are provided for illustrative purposes only and are not to be construed as limiting. It can be appreciated that a visualization may also include a rendering of any portion of a symbol, insignia, logo, crest, sign, motif, or any combination or arrangement of graphical elements.

The visualizations may be configured by the use of a number of various mechanisms for associating data. For example, the position of a rendered object based on a characteristic relative to the position of related data may provide a visual indication of an association between the subject and related data. Such examples may include a vertical or horizontal alignment of two graphical elements containing colors or text. In addition, one or more graphical elements, such as arrows or lines, may provide a visual indication of an association between an entity and related data. In yet another example, display and layout properties, such as a font size and font, may be used to show an association between data, an entity or a subject.

FIG. 3A provides one illustrative example of a graphical user interface (UI) 300 that is configured to display visualizations (202A-202E) containing primary colors and related data (203A-203E). The UI 300 of FIG. 3A shows one example where the position of the visualizations (202A-202E) illustrate an association between the visualizations (202A-202E) and related data (203A-203E). In this example, a first visualization 202A includes the first primary color. In addition, the first visualization 202A is aligned with first section of related data 203A. As also shown, the other visualizations (202B-202E) and the other sections of related data (203B-203E) are arranged in a similar fashion. Visualizations (202A-202E) based on determined characteristics, e.g., primary colors, can be used to indicate associations between a subject, such as an entity, and related data (203A-203E). In addition, the visualizations (202A-202E) based on determined the characteristics can assist users and computers to readily identify a subject, such as an entity.

These examples provided herein are for illustrative purposes only and are not to be construed as limiting. For instance, although the above-described example includes the use of a color, it can be appreciated that other graphical elements or designs may be associated with a subject and/or data. For example, instead of a primary color, a particular black and white shading pattern may be used. In other examples, a primary color or a particular shading may border a spreadsheet cell containing associated data. It can be appreciated that visualizations may utilize any graphical element that includes any shape or pattern, which may surround or be positioned near associated data.

In another illustrative example, the input data 113 may include usage data regarding a number of products. For example, the input data 113 may indicate that WORD, EXCEL, POWERPOINT, and ONENOTE, have been respectively used 50, 30, 60 and 35 times. To provide users with a graphical indication of the products, the techniques disclosed herein can determine colors or other display properties that may be customarily associated with such products. The determined colors or other determined display properties may be used to generate a visualization that represents a subject and/or provides an association between the subject and related data.

In applying such an example to the techniques described above, the input data 113 may be analyzed by one or more technologies for determining a context, which can involve generating contextual information based on the input data 113. The generated contextual information, for example, may include the product name or other a related data such as a company name.

The contextual information is then communicated to a resource 120, such as a search engine. A response from the resource 120 may return one or more images or other data related to the identified products. In the current example, if the input data 113 includes the list of products, WORD, EXCEL, POWERPOINT, and ONENOTE, contextual data regarding the products can be generated. The contextual data is configured to obtain a response from the resource 120 producing one or more images related to the products.

The images may then be analyzed to determine a characteristic as described herein. In the current example, an image related to WORD may indicate a dominant color, blue. An image related to EXCEL, for example, may indicate a dominant color green. For illustrative purposes, POWERPOINT may be associated with another color, such as orange. ONENOTE may be associated with yet another color, such as purple.

Other characteristics, such as a font, style, theme, motif and/or any combination of display properties may be determined from the images. For example, existing technologies may analyze shapes and/or patterns within the images to determine one or more characteristics. In one specific illustration, using the example product, WORD, one or more algorithms for detecting shapes and/or patterns may identify one or more characteristics, such as the distinctive slanted font in the WORD logo. Characteristics such as a font and/or parts of the identified patterns or shapes may be identified. As described below, such characteristics may be used to generate one or more visualizations containing the patterns or shapes.

Using the determined characteristics of this example, one or more visualizations may be generated. FIG. 3B is a screen diagram showing an illustrative graphical user interface 300' that is configured to display visualizations. In this example, a first visualization 202F is configured to indicate usage data associated with WORD. In addition, based on the determined characteristic, at least a portion of the first visualization 202F may be blue. In addition, other characteristics may introduce another visualization 202F', based on another characteristic, such as a particular font or design. The other visualizations (202G-202I) may be respectively associated with the other products, e.g., EXCEL, POWERPOINT, and ONENOTE, and configured with the determined colors, e.g., green, orange, and purple. The visualizations (202F-202I) may be shaped and/or sized to convey the respective usage data. In this example, the visualizations (202F-202I) are formed into bar chart indicating a usage value for each product.

Figure 4:
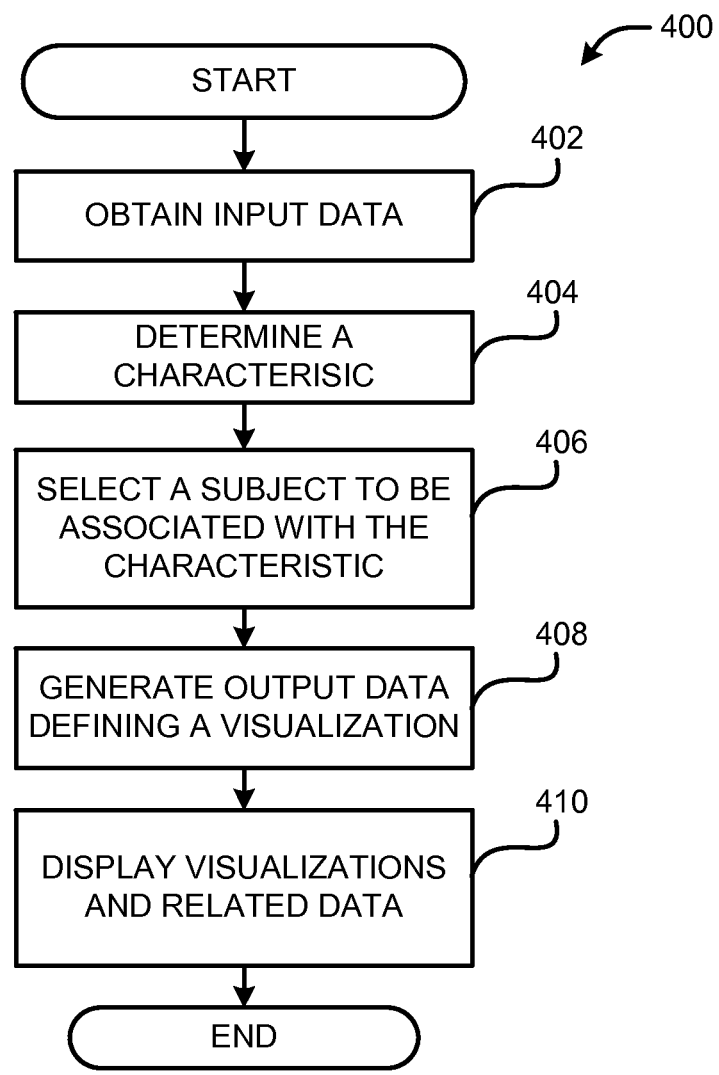
FIG. 4 is a flow diagram showing aspects of a routine disclosed herein for providing intelligent configuration of data visualizations.

Turning now to FIG. 4, aspects of a routine 400 for providing intelligent configuration of data visualizations are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof As will be described in more detail below, in conjunction with FIG. 1, the operations of the routine 400 are described herein as being implemented, at least in part, by an application, component, and/or circuit. Although the following illustration refers to the components of FIG. 1, it can be appreciated that the operations of the routine 400 may be also implemented in many other ways. For example, the routine 400 may be implemented, at least in part, by computer processor or processor of another computer. In addition, one or more of the operations of the routine 400 may alternatively or additionally be implemented, at least in part, by a computer working alone or in conjunction with other software modules, such as the server module 107.

With reference to FIG. 4, the routine 400 begins at operation 402, where the input data 113 is obtained. The input data 113 may be in any format and may be from any resource or device. In some configurations, the input data 113 may include characteristics that may be identified and selected by techniques described herein. For instance, if the input data 113 includes one or more images, techniques disclosed herein may identify one or more primary colors. If the input data 113 may include particular shapes, patterns, or other characteristics that may be detected by the system 100.

These examples are provided for illustrative purposes only and are not to be construed as limiting.

As summarized above, the techniques herein may also obtain input 113 data from one or more resources to determine one or more characteristics. For instance, a computing device 110 may obtain input data 113 containing text or other information. The computing device 110 may then analyze the input data 113 to determine a context related to a subject. Any known technology for determining a context and generating contextual data by analyzing text data or any other information may be used by the techniques disclosed herein. In one example, the input data 113 may include a descriptive sentence about a consumer product. One or more algorithms for analyzing such data may generate contextual data related to the product.

In one specific example, the contextual data can include a company name and/or a product name based on the descriptive sentence. The contextual data may be in the form of a string including information such as a company name or a product name. The contextual data may be sent to one or more resources 120, such as a search engine, social network platform and/or another service. The one or more resources 120 can return supplemental input data 113, such as an image or other data. As will be described below, one or more characteristics may be determined based on the supplemental input data 113.

Next, in operation 404, the program module 111 determines a characteristic from the input data 113. For example, in some configurations, the program module 111 may determine a primary color that is associated with an entity. The input data 113 may be analyzed to determine a number of colors and ratios associated with individual colors. A primary color may be determined based on the ratios and/or other data interpreted from the input data 113 and other data 117. In one illustrative example, the techniques disclosed herein may determine a primary color based, at least in part, on a portion of the input data 113. For example, if a portion of the input data includes an image of a flag, techniques described herein analyze the input data 113 to determine a primary color of the flag. If the input data 113 includes a particular shape or pattern, techniques herein may generate data defining such characteristics. These examples are provided for illustrative purposes only and are not to be construed as limiting.

Next, in operation 406, the program module 111 selects a subject to be associated with the determined characteristic. As summarized above, the determined subject may be based on the input data 113 and/or the other data 117. For instance, the input data 113 and/or other data 116 may include an image a flag and data indicating an associated subject, such as a country. Techniques disclosed herein may also associate the selected subject with the determined characteristic based on the input data 113 and/or other data 116.

Next, in operation 408, the program module 111 may generate output data 115 defining a visualization. The visualization may provide an indication of a subject. In addition, the visualization may provide an association between the determined characteristic, e.g., the primary color, with the determined subject, e.g., a country. As can be appreciated, the output data 115 may be generated in any format and may contain other data, which may be graphically associated with the selected subject.

Next, in operation 410, the program module 111 may cause a display of the output data 115. As shown in the UI 300 of FIG. 3A or the UI 300' of FIG. 3B, a display of the output data 115 may indicate an association between a subject, related data, and/or a primary color. These examples are provided for illustrative purposes and are not to be construed as limiting. It can be appreciated that any arrangement of data indicating a relationship between a subject and a graphical element or visualization based on a characteristic, such as a primary color, may be used by the techniques described herein.

Figure 5:
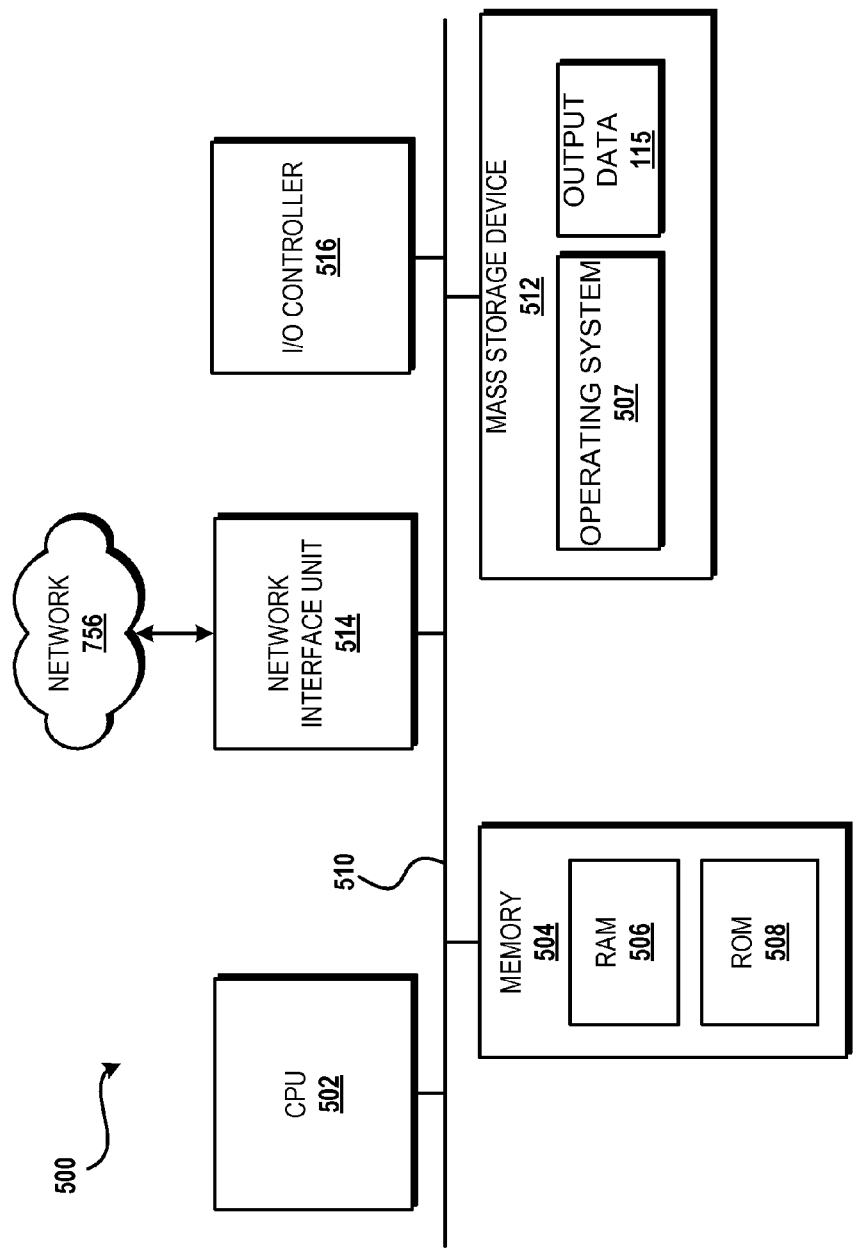
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the computing device 101 (FIG. 1), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, data, such as the output data 115, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 756 and/or another network (not shown). The computer architecture 500 may connect to the network 756 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
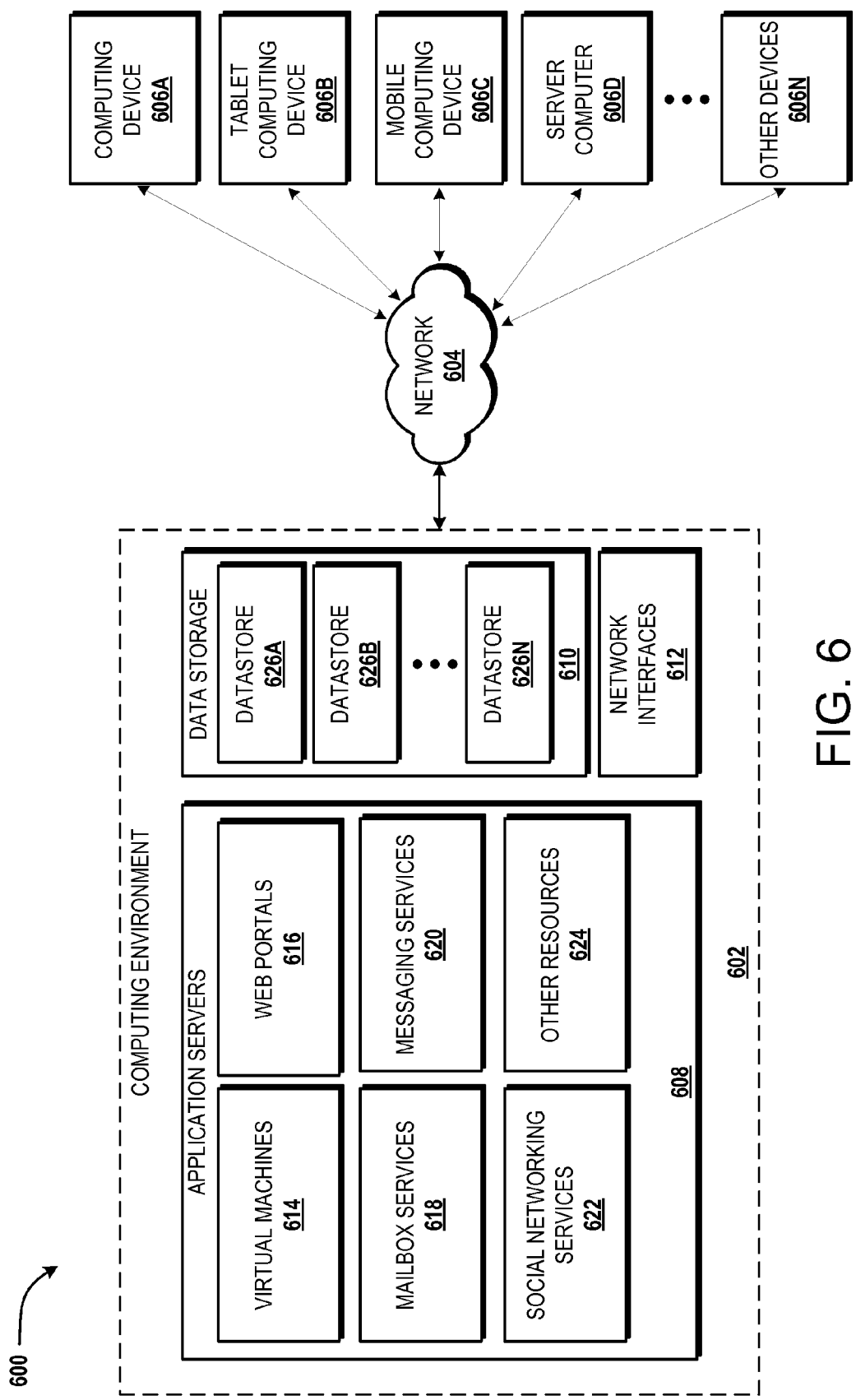
FIG. 6 is a diagram illustrating a distributed computing environment capable of implementing aspects of the techniques and technologies presented herein.

FIG. 6 depicts an illustrative distributed computing environment 600 capable of executing the software components described herein for providing intelligent configuration of data visualizations. Thus, the distributed computing environment 600 illustrated in FIG. 6 can be utilized to execute any aspects of the software components presented herein. For example, the distributed computing environment 600 can be utilized to execute aspects of the web browser 510, the content manager 105 and/or other software components described herein.

According to various implementations, the distributed computing environment 600 includes a computing environment 602 operating on, in communication with, or as part of the network 604. The network 604 may be or may include the network 756, described above with reference to FIG. 5. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the clients 606 are illustrated and described herein with reference to FIGS. 5 and 7. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for providing intelligent configuration of data visualizations. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/ or other information; services for commenting or displaying interest in articles, products, blogs, or other resources; and/or other services. In some configurations, the social networking services 622 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 622 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 622 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 622 are not mentioned herein for the sake of brevity. As such, the above configurations are illustrative, and should not be construed as being limited in any way. According to various implementations, the social networking services 622 may host one or more applications and/or software modules for providing the functionality described herein for providing intelligent configuration of data visualizations. For instance, any one of the application servers 608 may communicate or facilitate the functionality and features described herein. For instance, a social networking application, mail client, messaging client or a browser running on a phone or any other client 606 may communicate with a networking service 622 and facilitate the functionality, even in part, described above with respect to FIG. 4.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein provided herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module, such as the content manager 105. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing intelligent configuration of data visualizations, among other aspects. In one specific example, as summarized above, techniques described herein may be implemented, at least in part, by the web browser application 510 of FIG. 5, which works in conjunction with the application servers 608 of FIG. 6.

Figure 7:
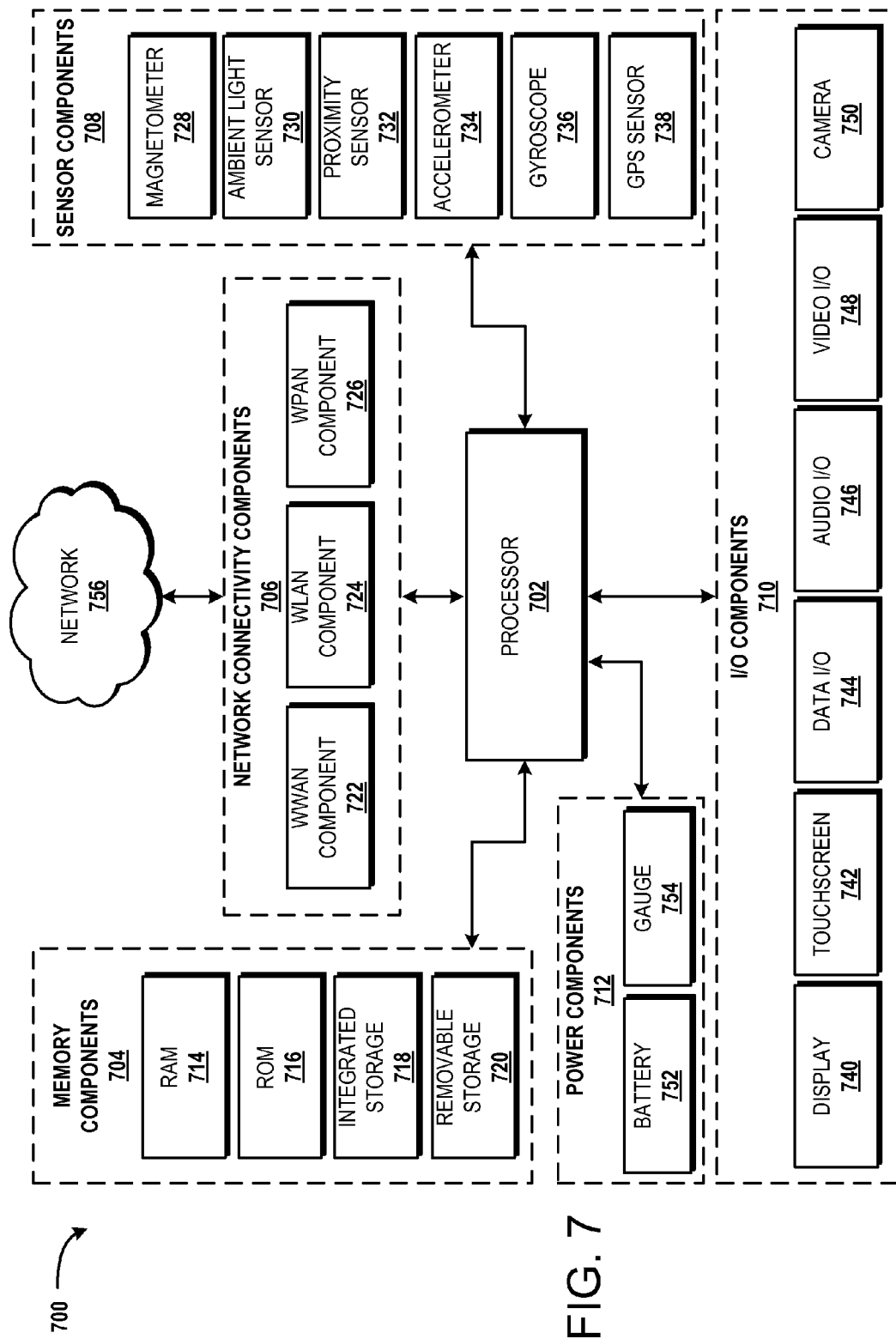
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components described herein for providing intelligent configuration of data visualizations. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 700 is applicable to any of the clients 606 shown in FIG. 6. Moreover, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individuals components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 604 of FIG. 6. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In some configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In some configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In some configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In some configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The disclosure presented herein may be considered in view of the following clauses.

Clause 1: A computer-implemented method, the method including obtaining image data associated with one or more entities; determining a primary color based, at least in part, on one or more colors defined in the image data; determining an individual entity of the one or more entities to be associated with the primary color; and generating output data associating the primary color with the individual entity.

Clause 2: The method of clause 1, wherein determining the individual entity to be associated with the primary color comprises: determining if the primary color is associated with at least one other entity of the one or more entities; and associating the primary color with the individual entity, if the primary color is not associated with the at least one other entity.

Clause 3: The method of clauses 1-2, wherein determining the individual entity to be associated with the primary color comprises: determining a score associated with the primary color, wherein determining the primary color based, at least in part, on the score; determining if the primary color is associated with at least one other entity of the one or more entities; and associating the primary color with the individual entity, if the primary color is not associated with the at least one other entity.

Clause 4: The method of clauses 1-3, wherein determining the individual entity to be associated with the primary color comprises: determining if the primary color is associated with at least one other entity of the one or more entities; and selecting an alternate color to be associated the individual entity, if the primary color is not associated with the at least one other entity.

Clause 5: The method of clauses 1-4, wherein selecting the alternate color is based on the one or more colors defined in the image data.

Clause 6: The method of clauses 1-5, wherein selecting the alternate color comprises: determining if a selected color is similar to an individual color of the one or more colors defined in the image data; and determining that the alternative color is the selected color if the selected color is not similar to an individual color of the one or more colors defined in the image data.

Clause 7: The method of clauses 1-6, wherein determining the primary color comprises: associating at least a portion of the image data with the individual entity; determining a ratio of colors used in the at least a portion of the image data; and determining the primary color based, at least in part, on the ratio.

Clause 8: A computing device, including a processor; and a computer-readable storage medium in communication with the processor, the computer-readable storage medium having computer-executable instructions stored thereupon which, when executed by the processor, cause the computing device to obtain image data associated with one or more entities; determine a primary color based, at least in part, on one or more colors defined in the image data; determine an individual entity of the one or more entities to be associated with the primary color; and generate output data associating the primary color with the individual entity.

Clause 9: The computing device of clause 8, wherein determining the individual entity to be associated with the primary color comprises: determining if the primary color is associated with at least one other entity of the one or more entities; and associating the primary color with the individual entity, if the primary color is not associated with the at least one other entity.

Clause 10: The computing device of clauses 8-9, wherein determining the individual entity to be associated with the primary color comprises: determining a score associated with the primary color, wherein determining the primary color based, at least in part, on the score; determining if the primary color is associated with at least one other entity of the one or more entities; and associating the primary color with the individual entity, if the primary color is not associated with the at least one other entity.

Clause 11: The computing device of clauses 8-10, wherein the bit stream contains a first network abstraction layer-compliant geometric data partition that is dependent on, and positioned within a threshold unit from, a second network abstraction layer-compliant geometric data partition.

Clause 12: The computing device of clauses 8-11, wherein the threshold unit is a pre-determined number of partitions.

Clause 13: The computing device of clauses 8-12, wherein the threshold unit is a pre-determined number of milliseconds.

Clause 14: The computing device of clauses 8-13, wherein the network abstraction layer of the bit stream includes a network abstraction layer-compliant geometric data partition positioned after a sequence header, a picture header, and a plurality of slice headers.

Clause 15: A computer-readable storage medium having computer-executable instructions stored thereupon which, when executed by a computer, cause the computer to: obtain geometric data; obtain video data; partition the geometric data into individual geometric data partitions associated with individual frames; generate individual network abstraction layer-compliant geometric data partitions from the individual geometric data partition; partition the video data into individual video data partitions associated with the individual frames; and integrate the individual network abstraction layer-compliant geometric data partitions with the individual video data partitions into a network abstraction layer of a bit stream.

Clause 16: The computer-readable storage medium of clause 15, wherein the computer-readable storage medium has further computer-executable instructions stored thereon that cause the computer to: parse the bit stream to extract the individual network abstraction layer-compliant geometric data partitions and the individual video data partitions; generate the individual geometric data partitions from the individual network abstraction layer-compliant geometric data partitions; process the individual geometric data partitions to generate the geometric data; and process the individual video data partitions to generate the video data.

Clause 17: The computer-readable storage medium of clauses 15-16, wherein an individual network abstraction layer-compliant geometric data partition and an individual video data partition are associated with a frame and are arranged in consecutive positions of the bit stream.

Clause 18: The computer-readable storage medium of clauses 15-17, wherein the bit stream contains a first network abstraction layer-compliant geometric data partition that is dependent on, and positioned within a threshold unit from, a second network abstraction layer-compliant geometric data partition.

Clause 19: The computer-readable storage medium of clauses 15-18, wherein the threshold unit is a pre-determined number of milliseconds.

Clause 20: The computer-readable storage medium of clauses 15-19, wherein the network abstraction layer of the bit stream includes a network abstraction layer-compliant geometric data partition positioned after a sequence header, a picture header, and a plurality of slice headers.

Based on the foregoing, it should be appreciated that concepts and technologies described herein provide intelligent configuration of data visualizations. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method performed using one or more processors, the method comprising:
    obtaining input data associated with one or more subjects;
    determining an image characteristic based, at least in part, on the input data;
    determining an individual subject of the one or more subjects to be associated with the image characteristic; and
    generating output data defining a visualization based, at least in part, on the image characteristic, wherein the visualization is configured to provide an indication of the individual subject when presented on a display.

2. The method of claim 1, wherein determining the characteristic comprises:
    determining if a first characteristic of the input data is associated with at least one other subject of the one or more subjects; and
    determining that the characteristic is the first characteristic, if the first characteristic is not associated with the at least one other subject.

3. The method of claim 1, wherein obtaining input data comprises:
    obtaining a first set of input data containing text related to one or more subjects;
    generating contextual data based on the first set of input data;
    obtaining a second set of input data based on the contextual data, wherein the second set of input data includes images, and wherein determining the characteristic based, at least in part, on the image.

4. The method of claim 1, wherein determining the characteristic comprises:
    determining if a first characteristic of the input data is associated with at least one other subject of the one or more subjects; and
    selecting an alternate characteristic as the characteristic, if the first characteristic is associated with the at least one other subject.

5. The method of claim 4, wherein selecting the alternate characteristic is based, at least in part, on one or more characteristics defined in the image data.

6. The method of claim 4, wherein selecting the alternate characteristic comprises:
    determining if the alternate characteristic is similar to an individual characteristic of the image data; and determining that the alternate characteristic is the characteristic if the alternate characteristic is not similar to the individual characteristic of the image data.

7. The method of claim 1, wherein the input data includes image data, and wherein determining the characteristic comprises:
   associating at least a portion of the image data with the individual subject;
   determining a ratio of colors used in the at least a portion of the image data; and
   determining the characteristic based, at least in part, on the ratio.

8. A computing device, comprising:
   a processor; and
   a computer-readable storage medium in communication with the processor, the computer-readable storage medium having computer-executable instructions stored thereupon which, when executed by the processor, cause the computing device to
      obtain input data including text data,
      generate contextual data by an analysis of the input data,
      obtain image data based on the contextual data,
      determine a characteristic based, at least in part, on one or more image properties of the image data, and
      generate output data defining a visualization based, at least in part, on the one or more image properties, wherein the output data is configured to provide an association between the visualization and a subject.

9. The computing device of claim 8, wherein determining the primary color comprises:
   determining if a first characteristic is associated with at least one other subject other than the subject; and
   determining that the characteristic is the first characteristic, if the first characteristic is not associated with the at least one other subject.

10. The computing device of claim 8, wherein determining the primary color comprises:
    determining a value associated with at least one property of the image data;
    determining a first characteristic based on the value;
    determining if the first characteristic is associated with at least one other subject; and
    determining that the characteristic is the first characteristic, if the first characteristic is not associated with the at least one other subject.

11. The computing device of claim 8, wherein determining the characteristic comprises:
    determining if a first characteristic is associated with at least one other subject of the one or more entities; and
    selecting an alternate characteristic as the characteristic, if the first characteristic is associated with the at least one other subject.

12. The computing device of claim 11, wherein selecting the alternate characteristic is based, at least in part, on one or more characteristics defined in the image data.

13. The computing device of claim 11, wherein selecting the alternate color comprises:
    determining if the alternate characteristic is similar to an individual characteristic of one or more colors defined in the image data; and
    determining that the alternative color is the characteristic if the alternative characteristic is not similar to an individual characteristic of the image data.

14. The computing device of claim 8, wherein determining the primary color comprises:
    associating at least a portion of the image data with the subject;
    determining a ratio of characteristics used in the at least the portion of the image data; and
    determining the characteristic based, at least in part, on the ratio.

15. A computer-readable storage medium having computer-executable instructions stored thereupon which, when executed by a computer, cause the computer to:
    obtain image data associated with one or more entities;
    determine a primary color based, at least in part, on one or more colors defined in the image data;
    determine an individual entity of the one or more entities to be associated with the primary color; and
    generate output data defining a visualization based, at least in part, on the primary color, wherein the visualization is configured to provide an indication of the individual entity.

16. The computer-readable storage medium of claim 15, wherein determining the primary color comprises:
    determining if a first color is associated with at least one other entity of the one or more entities; and
    determining that the primary color is the first color, if the first color is not associated with the at least one other entity.

17. The computer-readable storage medium of claim 15, wherein determining the primary color comprises:
    determining a value associated with at least one property of the image data;
    determining a first color based on the value;
    determining if the first color is associated with at least one other entity; and
    determining that the primary color is the first color, if the first color is not associated with the at least one other entity.

18. The computer-readable storage medium of claim 15, wherein determining the primary color comprises:
    determining if a first color is associated with at least one other entity of the one or more entities; and
    selecting an alternate color as the primary color, if the first color is associated with the at least one other entity.

19. The computer-readable storage medium of claim 18, wherein selecting the alternate color is based, at least in part, on the one or more colors defined in the image data.

20. The computer-readable storage medium of claim 18, wherein selecting the alternate color comprises:
    determining if the alternate color is similar to an individual color of the one or more colors defined in the image data; and
    determining that the alternative color is the primary color if the alternative color is not similar to the individual color of the one or more colors defined in the image data.

* * * * *